United States Patent [19]

Harita et al.

[11] Patent Number: 5,047,933
[45] Date of Patent: Sep. 10, 1991

[54] FULL WAVE FORM RESTORATION OF OPTICALLY DIGITIZED SEISMIC TRACES

[75] Inventors: Yoichi Harita; James C. Schatzman, both of Fullerton, Calif.

[73] Assignee: Chevron Research Company, San Francisco, Calif.

[21] Appl. No.: 471,047

[22] Filed: Jan. 26, 1990

Related U.S. Application Data

[63] Continuation of Ser. No. 160,962, Feb. 26, 1988, abandoned.

[51] Int. Cl.[5] .......................... G01V 1/28; G01V 1/34
[52] U.S. Cl. .................................... 364/421; 346/33 C
[58] Field of Search .......................... 364/421; 367/71; 358/163, 282, 284; 346/110 R, 33 C; 355/52, 67

[56] References Cited

U.S. PATENT DOCUMENTS

| | | | |
|---|---|---|---|
| 3,919,473 | 11/1975 | Cotter | 358/163 |
| 4,561,015 | 12/1985 | Korch | 358/44 |
| 4,701,809 | 10/1987 | Barrett | 358/293 |
| 4,783,836 | 11/1988 | Takashima | 358/163 X |

FOREIGN PATENT DOCUMENTS 0086658 5/1983 Japan .
0175780 8/1986 Japan .
0108378 5/1987 Japan .

OTHER PUBLICATIONS

Howell, Jr. et al., "Simple Digitizer for Paper Seismograms", *Bulletin of the Seismological Society of America*, vol. 56, No. 2, Apr. 1966, 605-608.

*Primary Examiner*—Clark A. Jablon
*Attorney, Agent, or Firm*—Edward J. Keeling; Matt W. Carson

[57] ABSTRACT

A method for digitizing seismic traces comprising optically digitizing the seismic sections to produce a digitized image, normalizing the digitized image for brightness to produce a normalized digitized image, geometrically straightening the digitized image, and recovering the negative portions of said seismic traces to produce a fully restored wave form of the digitized image.

4 Claims, 4 Drawing Sheets

FLOW CHART FOR PHOTODIGITIZATION OF SEISMIC WAVEFORMS

INPUT DATA
FIG_1

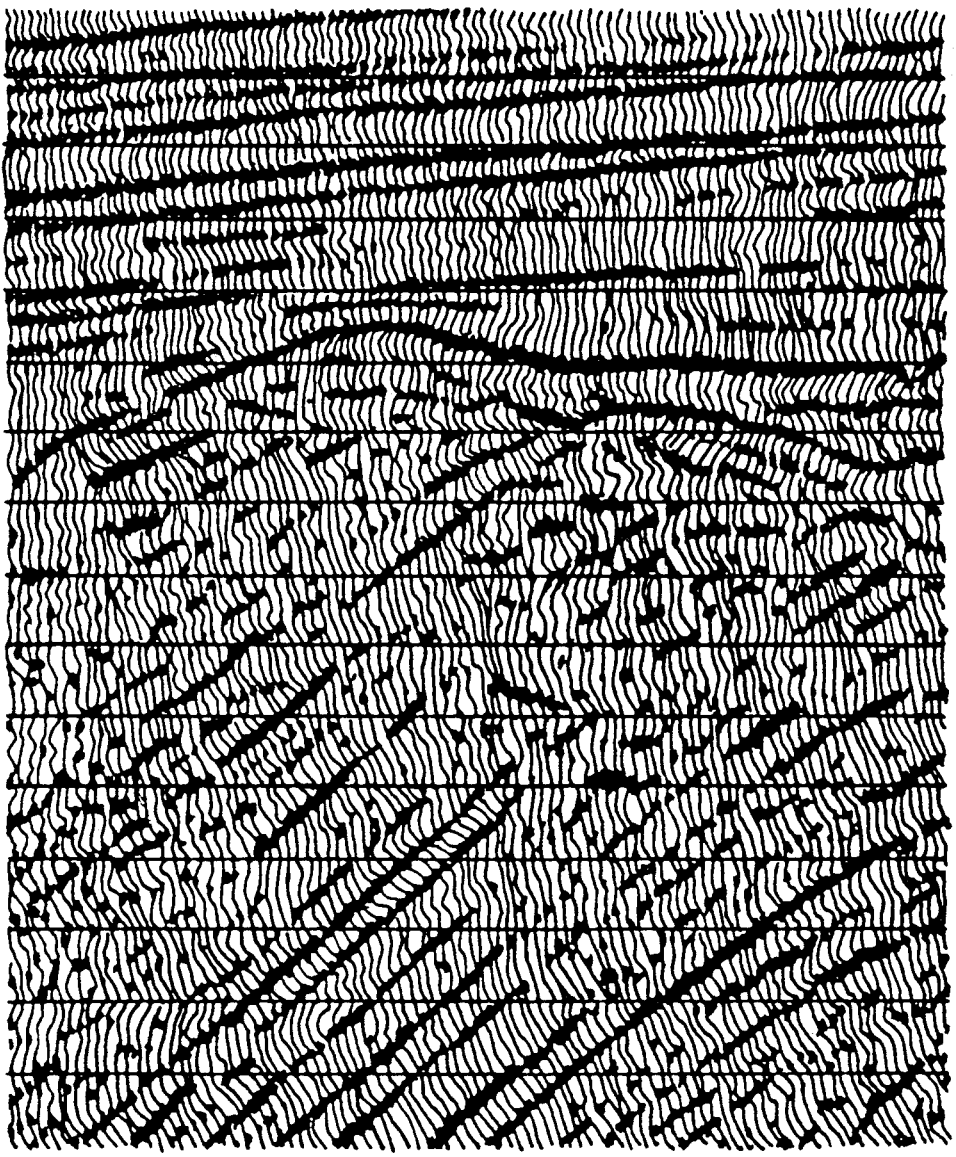
DIGITIZED OUTPUT DATA
FIG_2

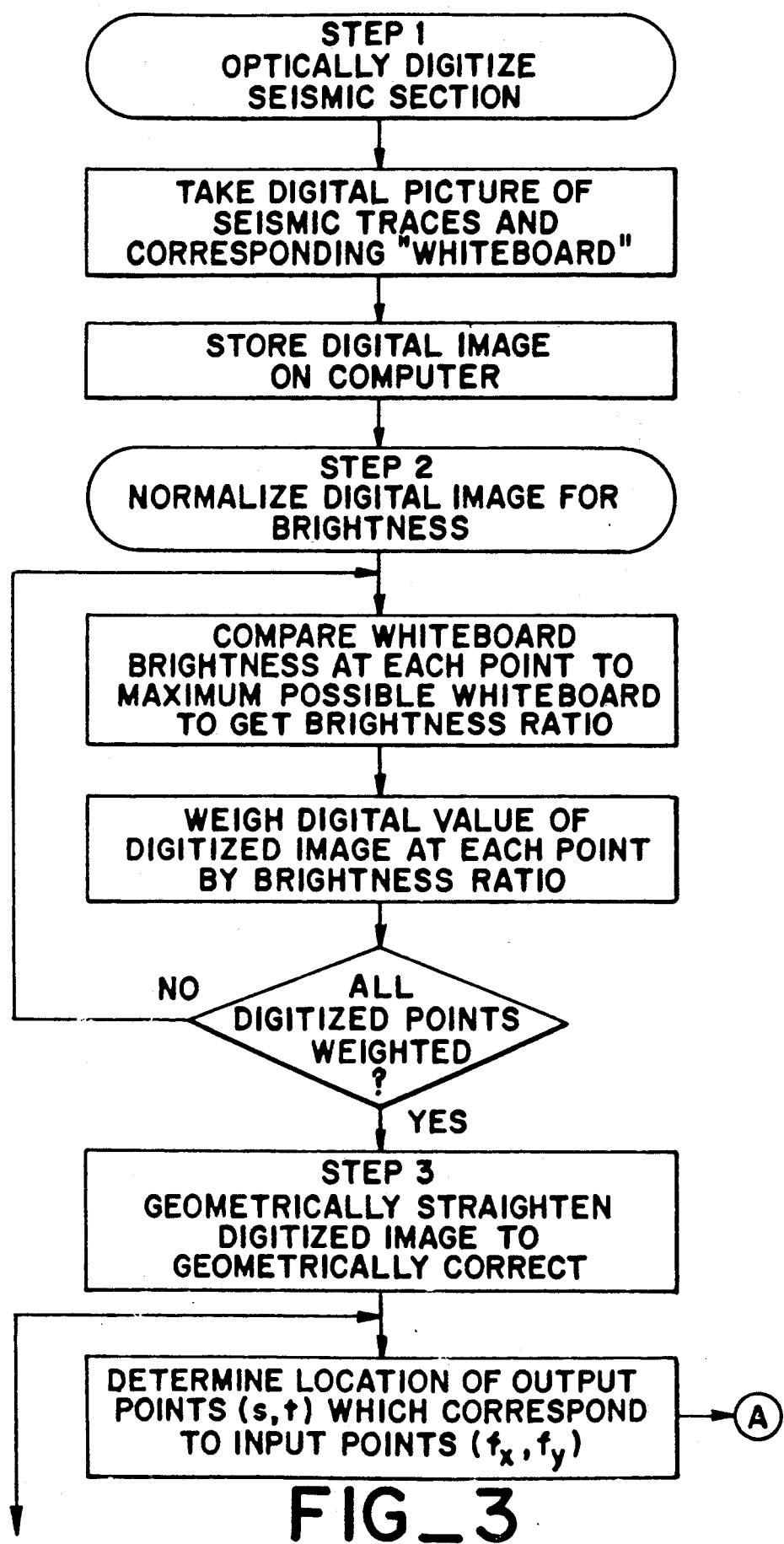
FIG_3

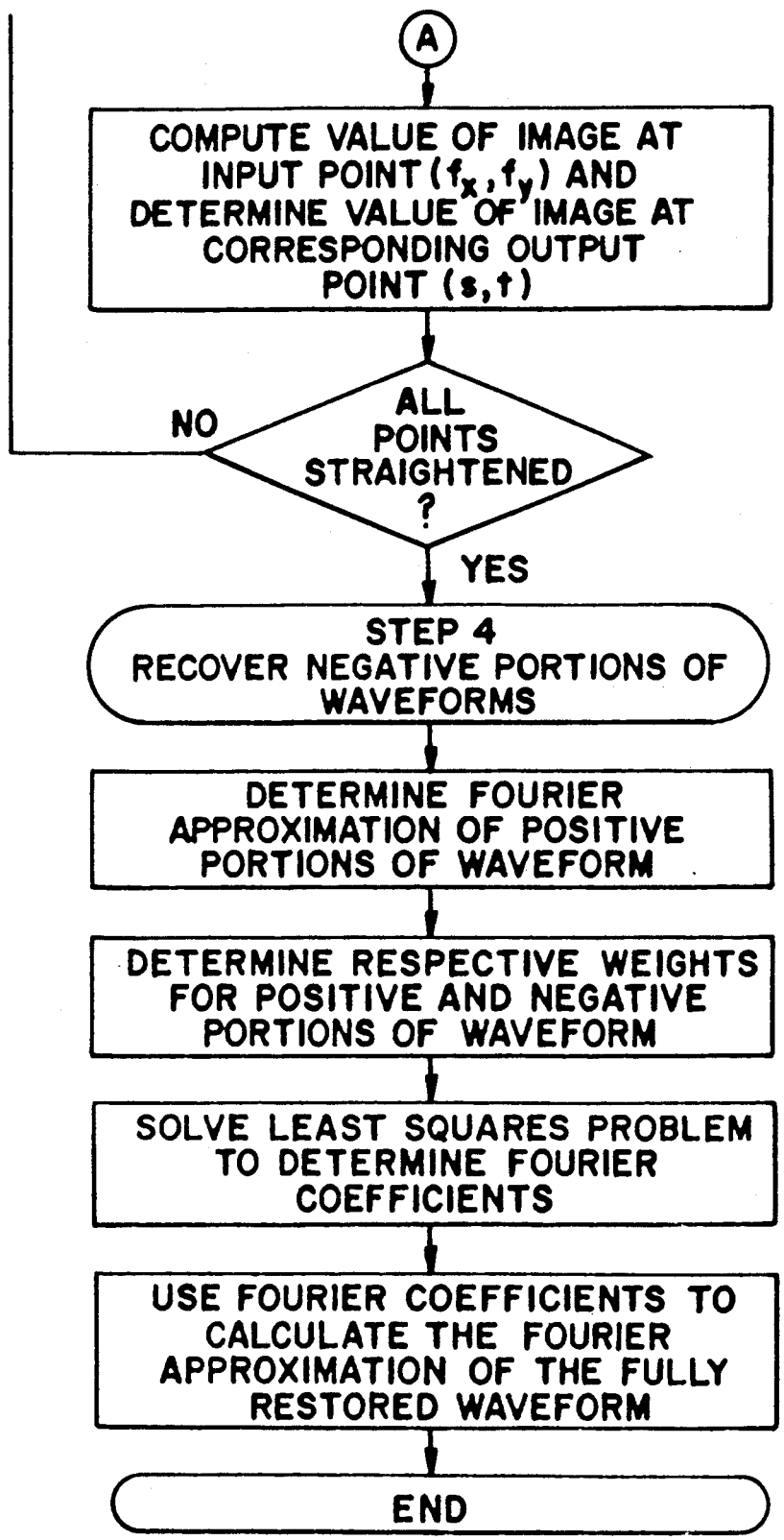
FLOW CHART FOR PHOTODIGITIZATION OF SEISMIC WAVEFORMS
FIG_3 (CONT.)

FULL WAVE FORM RESTORATION OF OPTICALLY DIGITIZED SEISMIC TRACES

This application is a continuation of application Ser. No. 160,962, filed Feb. 26, 1988, now abandoned.

Method for Photodigitizing Seismic Sections

The present invention relates to a method for photodigitizing seismic sections. First, a seismic section is optically digitized. Then it is normalized for brightness. Next, it is geometrically corrected and recovered to produce a fully restored wave form.

Hydrocarbons are normally found in association with thick sedimentary sequences in major sedimentary basins. There are several prerequisites for the accumulation of oil or gas in commercial quantities: a suitable source rock, reservoir rock and cap rock; a sediment burial history conducive to the conversion of original organic matter contained within the sedimentary pile into hydrocarbons; and a suitable trap to allow the accumulation of the oil or gas and prevent its upward escape to the surface. There are many types of trap, including tectonic structures such as anticlines or tilted fault blocks, structure associated with halokinesis such as tilted strata on the flanks of salt domes, and stratigraphic traps such as local sand bodies surrounded by clay envelopes, or local reef developments in limestone sequences.

Water, oil and gas can accumulate in the pore spaces of reservoir rocks in these trapping environments with a disposition that is determined by their relative specific gravities: gas at the top, oil in the middle and water at the base. Although seismic reflection surveys can sometimes directly detect the boundaries of acoustic impedance between different fluid layers in a reservoir rock, geophysical exploration for hydrocarbons normally employs an indirect approach, searching for the traps, such as anticlinal closures, within which the oil or gas may be present.

The initial round of seismic exploration normally involves speculative surveys along widely spaced profile lines covering large areas. In this way the major structural or stratigraphic elements of the regional geology are delineated, so enabling the planning of detailed, follow-up reflection surveys in more restricted areas containing the main prospective targets. Where good geological mapping of known sedimentary sequences exists, the need for expenditure on initial speculative seismic surveys is often much reduced and effort can be concentrated from an early stage on the seismic investigation of areas of particular interest.

Detailed reflection surveys involve closely spaced profile lines and a high density of profile intersection points in order that reflections can be correlated reliably from profile to profile and used to define the prevailing structure. Initial seismic interpretation is likely to involve structural mapping, using time-structure and/or isochron maps in the search for the structural closures that may contain oil or gas. Any closures that are identified may need further delineation by a second round of detailed seismic surveying before the geophysicist is sufficiently confident to select the location of an exploration borehole from a time-structure map. In cases of complex structure or where fine structural detail is required, seismic interpretation is based on migrated records.

Exploration boreholes are normally sited on seismic profile lines so that the borehole logs can be correlated directly with the local seismic section. This facilitates precise geological identification of specific seismic reflectors. Particularly in offshore areas where drilling is highly expensive (typically 10-20 times the cost of drilling on land), and where the best quality seismic reflection data are generally obtained, seismic stratigraphy is often employed to obtain more insight into prevailing sedimentary lithologies and paleoenvironments. Seismic stratigraphy provides additional criteria on which to select area for detailed study, for example, the recognition of local deltaic or reef facies developments, with an associated high reservoir potential, in a broader sedimentary sequence.

The contribution of seismic surveying to the development of hydrocarbon reserves does not end with the discovery of an oil or gas field. Refinement of the seismic interpretation, possibly using information from additional seismic lines, will optimize the location of production boreholes. In addition, seismic modeling of amplitude variation and other aspects of reflection character displayed on seismic section across the producing structure can be used to obtain detailed information on the geometry of the reservoir and on internal lithological variations that may affect the hydrocarbon yield.

Much of geophysical surveying is concerned with the measurement and analysis of waveforms that express the variation of some measurable quantity as a function of distance or time. The quantity may, for example, be the strength of the Earth's gravitational or magnetic field along a profile line across a geological structure; or it may be the displacement of the ground surface as a function of time associated with the passage of seismic waves from a nearby explosion. The analysis of waveforms such as these represents an essential aspect of geophysical data processing and interpretation.

Waveforms of geophysical interest generally represent continuous (analogue) functions of time or distance. The quantity of information and, in some cases, the complexity of data processing to which these waveforms are subjected are such that the processing can only be accomplished effectively and economically by digital computers. Consequently, the data often need to be expressed in digital form for input to a computer, whatever the form in which they were originally recorded.

Over the years in the oil and gas industry there have been literally hundreds of thousands of well logs run in boreholes drilled in the earth throughout the world. There are many various type logs, such as the resistivity log, gamma ray, velocity log, etc. As is known in the art, it is becoming increasingly desirable to convert analog data, including these well logs, into digital data having finite values which can be used in digital computers.

Accordingly, it is the principal object of the present invention to provide an improved method for digitizing seismic data. Other objects, advantages and features of this invention will become apparent to these skilled in the art from the following description of the appended claims.

SUMMARY OF THE INVENTION

The present invention relates to a method for photodigitizing a seismic traces. It comprises: (a) optically digitizing the seismic section to produce a digitized image; (b) normalizing the digitized image for brightness to produce a normalized digitized image; (c) geometrically straightening the digitized image to produce a geometrically corrected image; and (d) recovering the negative of the seismic traces to produce a fully restored wave form of the digitized image.

BRIEF DESCRIPTION OF THE DRAWINGS

FIG. 1 is an example of a paper seismic section input.
FIG. 2 is an example of photodigitized data.
FIG. 3 is a flowchart of the claimed method for photodigitizing wave forms contained on a seismic section.

DETAILED DESCRIPTION

Photodigitizing

Many seismic sections exist on paper and film without the support of digital tapes. For example, FIG. 1 shows an excerpt from a typical paper plot. In the method of the present invention these plots or traces are first optically digitized. This is accomplished with, for example, an EIKONIX camera. One of the EIKONIX models which can be used in the present invention is the Model 850, which consists of a row of 4096 charge coupled diodes ("CCD's") which convert optical input into digital information, in this case values between 0 and 255. Optical data enters the camera through a lens as commonly used in a consumer single lens reflex camera, a NIKON 55 mm lens in this application, and reaches the CCD array. The CCD array is moved so that it is invoked 4096 times, and the end product is a 2 dimensional array of 4096 times 4096 values varying between 0 and 255, or total of 16,777,216 values.

The set of over 16 million values is stored in a storage medium such as a disk drive controlled by any computer that is designated to drive the EIKONIX camera, such as the Digital Equipment computers (e.g., VAX 11/785, MICRO VAX II) or the IBM PC/AT or /XT.

Brightness Correction

The image obtained by a method as described above normally has an undesirable attribute resulting from uneven illumination during photodigitization. During the photodigitizing process, the paper seismic section is illuminated by four quartz halogen lamps which give very bright light on an object in the center and the light gets dimmer toward the edge of the object.

To compensate for this effect, the digitized image is normalized for brightness. After the image of a seismic section is photodigitized, a white board is photodigitized using exactly the identical camera settings except for the opening of the lens which should be closed one notch (e.g., from 5.6 to 8) to avoid optical saturation of the CCD array.

$$OUTPUT(I) = [INPUT(I) * M]/WHITE(I)$$

where INPUT(I) is an individual value of the seismic image, M is the maximum value of the white board image, and WHITE(I) is the corresponding white board image to the seismic image at the identical location. This operation will remove regional variations of illumination, and also set the maximum value of the output image to 255, thus restoring the maximum dynamic range. This operation must be performed for each of 16,777,216 points.

Geometric Correction

Another problem with the image obtained by the above method is that we cannot convert the image directly to the desired digital seismic data because of geometric distortions caused partly by the camera lens, and partly by the medium on which the seismic section is printed such as paper. It is essential that the resulting image of a seismic section is perfectly rectangular after a proper correction is applied.

The first step of geometrically straightening the digitized image is to compute a set of two equations relating the input (raw digitized) image to the output (corrected) image. The set of equations take the form:

$$f_x = c_0 + c_1 s + c_2 t + c_3 s^2 + c_4 s t + c_5 t^2$$

$$f_y = d_0 + d_1 s + d_2 t + d_3 s^2 + d_4 s t + d_5 t^2$$

where s and t are values in the coordinate system of the output image and $f_x$ and $f_y$ are values in the coordinate system of the input image. In order to compute the coefficients c's and d's, it is necessary to pick at least 6 points in the input image, and find both their coordinate values in the input image and in the output image. In the present invention, 9 points are picked - 4 corners of the seismic section, and 5 mid points for the sake of convenience. The four corners of the seismic section also serve to denote the edges of the output image which we wish to extract from the input image.

To compute the values c's and d's, if we pick more than 6 points, we have more equations than unknowns, and we can use the least squares criterion—differentiate the f's with respect to c's and d's, and set the results to zero and solve for c's and d's.

The next step in this process of obtaining the geometrically corrected output image is to compute values of the output for each of the desired points designated by trace position and sample position in the output react angular coordinates. Using the two equations derived as above, we can compute input image coordinates corresponding to the output coordinates of each point. What remains to be done is to compute the value of the image at those input coordinates.

Here, we utilize the bivariate generalization of Hermite's interpolation formula by A.C. Ahlin (1964). See Ahlin, A.C., 18 Math. Comp 264–273 (1964), A Bivariate Generalization of Hermite's Interpolation Formula, which is hereby incorporated by reference.

The basic formulation is: given values of f, g, and h at points $(x_i, Y_r)$, $i,r = 1,n$, to find the value of f at an arbitrary point $(x,y,)$, $$f(x,y) = \sum_{i=1}^{n} \sum_{r=1}^{n} h_i(x) g_r(y) f(x_r, y_i) + \sum_i \sum_r h_i(x) \bar{g}_r(y) \frac{\partial}{\partial y} f(x_r, y_i) +$$

$$\sum_i \sum_r \bar{h}_i(x) g_r(y) \frac{\partial}{\partial x} f(x_r, y_i) + \sum_i \sum_r \bar{h}_i(x) \bar{g}_r(y) \frac{\partial^2}{\partial x \partial y} f(x_r, y_i)$$

where $$\bar{h}_i(x) = [1 - 2 l_i'(x_r)(x - x_r)] [l_i(x)]^2$$

$$h_i(x) = (x - x_r) [l_i(x)]^2$$

$$g_i(y) = [1 - 2 m_i'(y_i)(y - y_i)] [m_i(y)]^2$$

$$\bar{g}_i(y) = (y - y_i) [m_i(y)]^2$$

$$l_i(x) = \frac{\lambda(x)}{(x - x_r)\lambda'(x)}, \quad m_i(y) = \frac{\mu(y)}{(y - y_i)\mu'(y)}$$

$$\lambda(x) = \prod_{i=1}^{n} (x - x_i), \quad \mu(y) = \prod_{j=1}^{n} (y - y_j)$$

The strategy is to save computation time by assuming that the data points to be interpolated fall on grid points made up by 9×9 mesh. If the point to be computed does not fall on a grid point, a nearest point on the grid is used.

Using local coordinates, we assign coordinate values to four input points at the vertices of a square surrounding the output point to be evaluated:

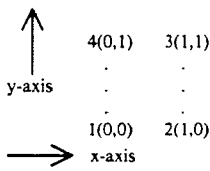

By evaluating the coefficients at the four corners (n=4), we get:

$$l_1 = l_4 = 1 - x$$

$$l_2 = l_3 = x$$

$$l_1' = l_4' = -1$$

$$l_2' = l_3' = 1$$

$$h_1 = h_4 = (1 + 2x)(1 - x)^2$$

$$h_2 = h_3 = (3 - 2x)x^2$$

$$\bar{h}_1 = \bar{h}_4 = x(1 - x)^2$$

$$\bar{h}_2 = \bar{h}_3 = (x - 1)x^2$$

g's and m's are identical to h's and l's except that the variables are y instead of x.

We precalculate those coefficients at all 81 points inside the square of side 1.

(x,y=0, ⅛, 2/8, ⅜, 4/8, ⅝, 6/8, ⅞, 1)

For each output value to be computed, first we find the grid point nearest the true coordinate, second evaluate the first and second derivatives of the function at the four corners, and third evaluate the output point.

This approximation saves much computation time by avoiding the computations of l, h, m, and g for every output point.

Full Wave Form Restoration

In the third and the final step of the series of corrections to be made, the seismic data obtained as described above must further go through a process to recover the negative portions of the waves.

When the EIKONIX camera converts the paper seismic section to a set of digital values, the dark portions of the paper data, which corresponds to the positive parts of wave form, are recognized by the camera as valid data values, and wiggle lines, if there is any to denote the negative portions of wave form, cannot be recognized by the camera to be converted to proper digital data. Therefore, the resulting digital data consist of correct positive portions and incorrect negative portions in the wave form.

We wish to recover the full wave form, T(t), from the photodigitized data, C(t), over a frequency range $f_L$ to $f_U$.

$$C(t) = \begin{cases} T(t) \text{ for } T(t) \geq \tau \\ \text{random noise for } T(t) < \tau \end{cases}$$

where $\tau$ is the clipping threshold value (e.g., 0). Direct band-pass filtering, which allows certain frequency components of the input data to pass through, of C(t) gives an approximation to T(t), which is distorted somewhat because of the non-linear nature of the clipping operator. We prefer using a filter computer program for filtering.

An alternative is to solve for $a = \{a_f\}$ and $b = \{b_f\}$ where f varies between $f_L$ (lower frequency cutoff) to $f_U$ (upper frequency cutoff), while minimizing $$\sum_t \bar{w}(t)[C(t) - g(t,\bar{a},\bar{b})]^2$$

where $$g(t,\bar{a},\bar{b}) = \begin{cases} \sum_{f=f_L}^{f_U} (a_f\cos(2\pi ft) + b_f\sin(2\pi ft)) \text{ for } C(t) \geq \tau \\ \tau \text{ for } C(t) < \tau \end{cases}$$

$$\bar{w}(t) = \begin{cases} 1 \text{ for } C(t) \geq \tau \\ \omega \text{ for } C(t) < \tau \end{cases}$$

$\omega$ = small stabilization factor (e.g., $10^{-4} \rightarrow 10^{-1}$).

By a judicious choice of $f_L$, $f_U$ and $\omega$, the resulting approximation $\bar{T}(t)$ to T(t):

$$\bar{T}(t) = \sum_{f=f_L}^{f_U} (a_f\cos(2\pi ft) + b_f\sin(2\pi ft))$$

will be an improvement over direct filtering of C(t). We prefer using a computer program which uses the principles of Fourier analysis and least squares minimization to accomplish this.

EXAMPLE

The invention will be further illustrated by the following example which sets forth particularly advantageous methods and composition embodiments. While the example illustrates the present invention, it is not intended to limit it.

FIGS. 1 and 2 demonstrate the effect of applying the present invention to a paper seismic section. This example is an enlargement of a small portion of a much larger seismic section in order to display the details of the wave forms.

FIG. 1 is taken from the input paper seismic section. FIG. 2 is the same data taken from the photodigitized data plotted on an electrostatic plotter connected to a large computer. Both plots are made in an identical scale. While the fine details of the input wave forms are not completely duplicated on the output plot, the output plot is a reasonably accurate representation of the input section. Our experience shows that the output digital representation is more than adequate to aid geologists in interpreting the seismic data for petroleum exploration, particularly after subsequent digital processing such as event enhancement and migration, which had not been applied to the input paper seismic section.

While the present invention has been described with reference to specific embodiments, this application is intended to cover those various changes and substitutions which may be made by those skilled in the art without departing from the spirit and scope of the appended claims.

What is claimed is:

1. A method for photodigitizing wave forms contained on a seismic section, comprising:
   a. optically digitizing said wave forms on said seismic section to produce a digitized image;
   b. normalizing said digitized image to produce a normalized digitized image;
   c. geometrically straightening said digitized image to produce a geometrically corrected digitized image; and
   d. recovering the negative portions of said wave forms on said seismic section to produce a fully restored wave form of said digitized image.

2. A method according to claim 1, wherein step (c) comprises using least squares minimization criterion.

3. A method, according to claim 1, wherein step (d) is accomplished using a filter computer program.

4. A method, according to claim 1, wherein step (d) is accomplished using a computer program which uses the principles of Fourier analysis and least squares minimization.

* * * * *